United States Patent [19]

Slagley

[11] 4,146,429
[45] Mar. 27, 1979

[54] DISPERSEMENT APPARATUS

[76] Inventor: Michael W. Slagley, 621 N. Glenrose Dr., Orange, Calif. 92669

[21] Appl. No.: 687,680

[22] Filed: May 19, 1976

[51] Int. Cl.² .............................................. G21C 9/00
[52] U.S. Cl. ........................................ 176/38; 176/87
[58] Field of Search ................... 176/37, 36, 210, 87; 241/DIG. 9

[56] References Cited

U.S. PATENT DOCUMENTS

| | | | |
|---|---|---|---|
| 3,677,892 | 7/1972 | Schabert | 176/40 |
| 3,702,802 | 11/1972 | Jansen, Jr. | 176/38 |
| 4,045,284 | 8/1977 | Rosewell | 176/38 |

FOREIGN PATENT DOCUMENTS

| | | | |
|---|---|---|---|
| 2363844 | 6/1975 | Fed. Rep. of Germany | 176/38 |
| 360089 | 8/1962 | Sweden | 102/23 |
| 958088 | 5/1964 | United Kingdom | 176/40 |

*Primary Examiner*—Samuel W. Engle
*Assistant Examiner*—Ralph Palo
*Attorney, Agent, or Firm*—Jack C. Munro

[57] ABSTRACT

A dispersement apparatus for an enlarged mass of fissionable material which causes the liquid fissionable material to move by gravity into a first passage means, the first passage means being connected to a plurality of second passages with the fissionable material separating into the second passages, each second passage being connected to a plurality of third passages which results in the liquid fissionable material being further separated. Each of the passages will contain adjacent the junction thereof with the previous passage a quantity of low melting point material, such as lead or tin. The heat of reaction of the fissionable material will readily melt this meltable material prior to entering the passage. The free end of the third passage may extend within a sand base with explosive means being located therewith to further and ultimately very finely disperse the fissionable material.

6 Claims, 2 Drawing Figures

DISPERSEMENT APPARATUS

BACKGROUND OF THE INVENTION

The field of this invention relates to nuclear reactors, and more particularly to an emergency disposal system for an "out of control" nuclear reaction, this disposal system taking the form of a mass separation system which separates the larger nuclear mass into a plurality of smaller masses.

Nuclear reactors contain a plurality of fissionable material in the form of a plurality of elongated rods. Surrounding each of these rods is a control rod assembly and the nuclear reaction is controled by movement of the control rods and exposure of the fissionable material in one rod to the fissionable material in another rod. The rate of reaction is directly dependent upon the size of the mass. The more mass of fissionable material exposed, the greater the rate of reaction. If perchance an excessive amount of mass becomes exposed, what occurs is termed a "core meltdown".

A "core meltdown" is perhaps the most discussed and most feared phenomenon of all potentialities of nuclear reactors. This problem is especially of major concern since the use of nuclear reactors to produce electricity is becoming quite common. The fantastic heat generated by a molten core, estimated about six thousand degrees Farenheit, is sufficient to melt through virtually any material that might be placed in its path as it bores downward through the reactor vessel and all containments, eventually releasing at least a portion of its radioactive fission product inventory through the earth, or possibly through breaks in the containment sphere. At the present time, the use of reliable and practical methods of containing a large molten mass of fuel that would probably result from a meltdown do not exist.

At the present time, there has not been a complete meltdown of a nuclear reactor core. However, in certain instances there have been partial meltdowns which have been stopped by currently employed safety structure within the nuclear reactor. Even the occurrence of a partial meltdown has been described as a bit worse then the maximum credible accident. There is a chance that a complete meltdown would result in the fissionable material being directly exposed to the atmosphere and the pollution that would occur as a result thereof would undoubtedly be overwhelming.

SUMMARY OF THE INVENTION

The subject matter of this invention relates to structure which is to be incorporated within the building foundation for a nuclear reactor. If a complete meltdown occurs within a nuclear reactor, the molten mass of high temperature fissionable material will move by gravity in a downward direction, consuming everything in its path. The structure of this invention is to route the molten mass of material into a plurality of separate paths and then to further separate the separate paths of nuclear mass into still smaller separate quantities of fissionable material. By the separating of the combined nuclear mass into a plurality of separate masses, the rate of reaction is significantly slowed and also the produced heat of reaction is slowed. The net result is to eliminate the hazard produced by the combined quantity of nuclear mass.

The structure of this invention achieves the prior objective by locating a plurality of passageways within the building foundation of a nuclear reactor facility. The passageways are constructed so that the molten nuclear mass is caused to be conducted within a plurality of separate first passageways and each first passageway is connected to a plurality of separate second passageways. Each second passageway is connected to a plurality of third passageways and, if needed, each third passageway is connected to a plurality of fourth passageways. At the junction between different passageways there may be included a readily meltable material, such as lead or tin or oxides thereof. The function of this material is to slow the movement of the nuclear mass and permit such to be evenly distributed between the different passageways. Also, the combining of the meltable material with the fissionable material functions to disperse the material and further decrease the rate of reaction. At each junction, the cross-sectional area of the passage leading to the junction is to be approximately equal to the cross-sectional area of the combined passageways leading from the junction. The fourth passageways may terminate in an explosive charge with this explosive charge being located in a bed of sand. Upon the fissionable material reaching the explosive charge, the explosive charge will automatically ignite causing the fissionable material to be finely dispersed within the sand. This fine distribution of the diffusable material would decrease the rate of reaction to where it is no longer considered harmful.

DETAILED DESCRIPTION OF THE SHOWN EMBODIMENT

Figure 1:
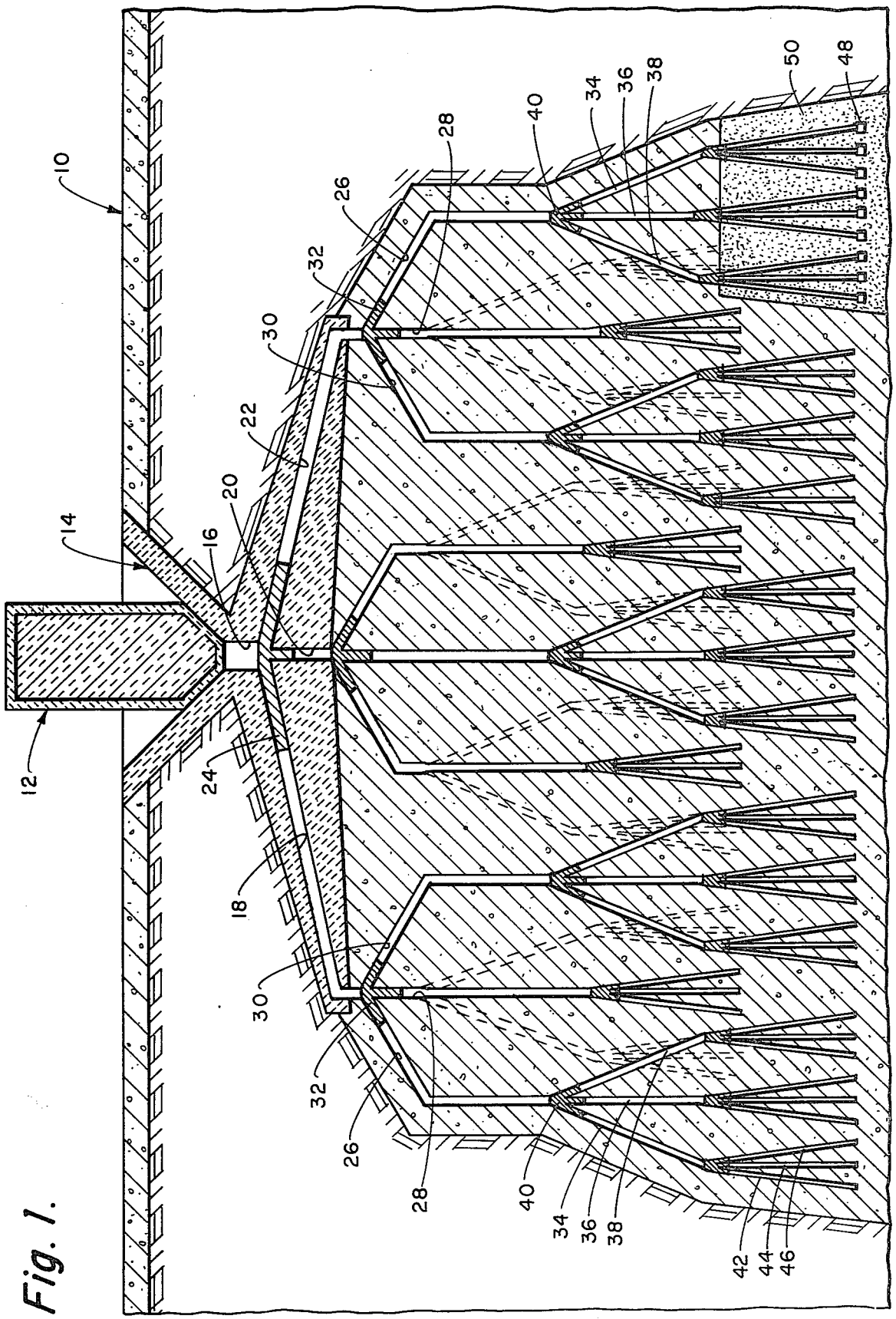
FIG. 1 is a cross-sectional view in schematic form of a building foundation for a nuclear reactor in which the subject matter of this invention is broadly shown.
Figure 2:
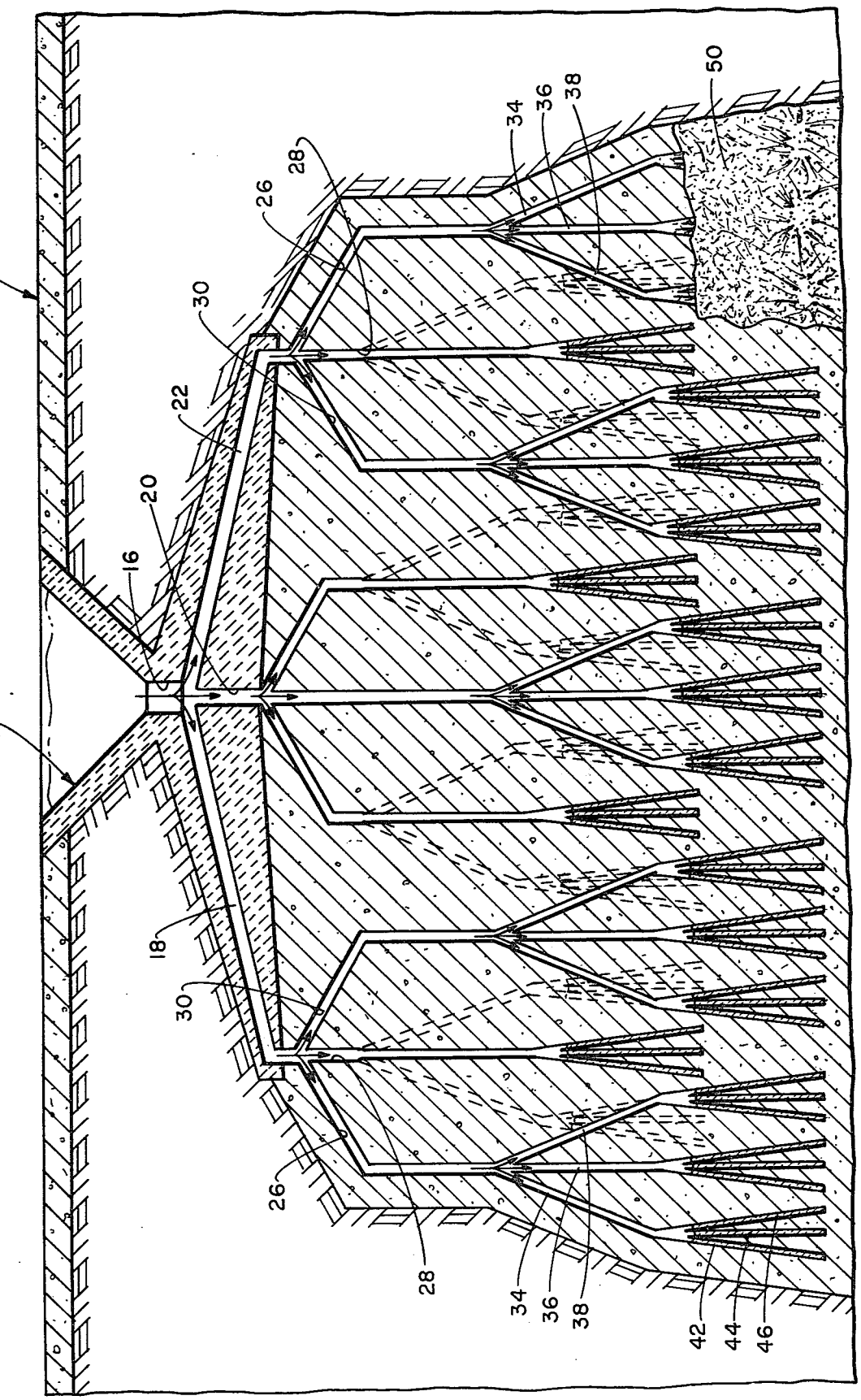
FIG. 2 is a view similar to FIG. 1 but showing the nuclear mass being evenly distributed throughout the branches of the passageways structure of this invention.

Referring particularly to the drawings, there is shown in FIG. 1 the building foundation 10 of a nuclear reactor (not shown). Schematically, the nuclear reactor fissionable core is shown as mass 12, actually the mass 12 would be located at some position above the foundation 10.

The upper end of the foundation 10 and located under the mass 12 is a receiving funnel assembly 14. The funnel assembly 14 can take the form of a single enlarged funnel or take the form of a plurality of separate funnels, depending upon the particular installation.

The outlet 16 of the funnel assembly 14 leads to a plurality of first passageways 18, 20 and 22. The total cross-sectional area of the passageways 18, 20 and 22 is to be approximately equal to the cross-sectional area of the passageway 16. Although three in number of first passageways are shown, it is considered to be within the scope of this invention that more or less than three can be employed.

In the area of the junction of the first passageways 18, 20 and 22 with the passageway 16 there is located a quantity 24 of lead or tin or alloys thereof. It is also considered to be within the scope of this invention that other easily meltable materials could be used. Again, it is to be reiterated that the function of the material 24 is to facilitate even distribution of the molten fissionable material which is moved through passageway 16 and also, the material 24 is to intermix with the fissionable material to assist in decreasing the reaction. Also, the use of the meltable material functions to increase the fluidity of the fissionable material so it will continue to flow and distribute through the passages until it is assured that a safe, low temperature for the fissionable material has been achieved. Although the meltable material will normally be located only at the junctions of the passageways, it may also be located throughout the passageways. If the easily meltable material (such as oxides) was such that it was displaced and not mixable with the liquid fissionable material, the meltable material would rise to the upper surface of the liquid fissionable material. As the fissionable material continued to move downwardly, the oxide material would provide a radiation shield preventing escape of radiation contaminates through the upper passages and hence to the ambient. The radiation shield may occur by the oxide material rehardening and assuming a particular location or by remaining liquid and following the fissionable material in its downward path.

It is to be apparent that the subject matter of this invention will only be used in an emergency situation in which the solid mass of fissionable material 12 is caused to go out of control and become molten and begin to move under the effect of gravity.

The first passageway 18 terminates into a plurality of second passageways 26, 28 and 30. The first passageways 20 and 22 also lead to separate second passageway structure. Again, the number of second passageways is considered to be a matter of choice. Also, in normal practice, the totally combined cross-sectional area of the second passageways will be approximately equal to the cross-sectional area of its connected first passage. There will also be a quantity of easily meltable material 32 placed within the area of the junction of the passageways 26, 28 and 30 with the first passageway 18. The same is true also for the junction of the second passages with the first passages 20 and 22.

This passageway configuration is continued in a branch manner with the second passageway 26 being connected to a plurality of third passages 34, 36 and 38. The same procedure is true for each of the second passageways, with there also being a similar manner an easily meltable material 40 located in the area of the junction of the third passages with the second passage.

In actual practice, it may be sufficient to end with third passages which are connected to second passageway 28. However, in other instances it may be desirable to have each third passageway connect to a plurality of fourth passageways, such as the connection of passages 42, 44 and 46 with passageway 34. The previously mentioned cross-sectional area arrangement is to be normally maintained at the junction of each set of passages. Also, at the junction of each set of passages there may also be included easily meltable material.

In normal practice, it is envisioned that upon the material achieving the dispersement within the separated passages of the third or fourth passages, that sufficient dispersement is achieved so that the reaction has been brought into control and the heat of reaction will be lowered sufficiently so that the cement material of the foundation will not be caused to melt and will function as a plurality of separate spaced apart containers with a quantity of fissionable material. However, as an option, it may be desirable to include at the end of each fourth passage (at the end of the third passage if there are no fourth passages used) an explosive device 48. The explosive device 48 will normally take the form of a conventionally available explosive apparatus and the details of which are not believed necessary to discuss in relation to the structure of this invention. The explosive will normally be designed to be activated upon the fissionable material coming into contact therewith which will be designed to very finely distribute the fissionable material within a base layer 50 of loosely packed material, such as sand. Such a complete dispersement of the fissionable material would insure that the reaction would be completely under control.

What is claimed is:

1. A dispersement apparatus for a mass of fissionable material comprising:

a collecting chamber;

a first passage means connected to said collecting chamber, said first passage means comprises at least one in number of first passages, the upper end of said first passage means capable of receiving said liquid fissionable material from said collecting chamber;

second passage means connected to said first passage means at the lower end thereof, said first passage means terminates at said connection with said second passage means said second passage means comprising a plurality of separate second passages adapted to receive liquid fissionable material from said first passage means, there being a plurality of said second passages for each said first passage, each said second passage being substantially smaller in cross-section than each said first passage.

2. The apparatus as defined in claim 1 wherein:

the total cross-sectional area of said second passages which are connected to a single said first passage is approximately equal to the cross-sectional area of said first passage.

3. The apparatus as defined in claim 2 wherein:

there being at least three in number of said second passages for each said first passage.

4. The apparatus as defined in claim 3 wherein:

a solid material contained within a portion of one of said passage means, said solid material being capable of being readily melted upon coming into contact with the heated fissionable material.

5. A dispersement apparatus for a mass of fissionable material comprising:

a collecting chamber:

a first passage means connected to said collecting chamber, said first passage means comprises at least one in number of first passages, said first passage means capable of receiving said liquid fissionable material from said collecting chamber;

second passage means connected to said first passage means said second passage means comprising a plurality of separate second passages adapted to receive liquid fissionable material from said first passage means, there being a plurality of said second passages for each said first passage;

each said second passage being substantially smaller in cross-section than each said first passage;

the total cross-sectional area of said second passages which are connected to a single said first passage is approximately equal to the cross-sectional area of said first passage;

there being at least three in number of said second passages for each said first passage;

a solid material contained within a one of said passage means, said solid material being capable of being readily melted upon coming into contact with the heated fissionable material;

said second passage means terminating into a base of loosely packed material, explosive charge means connected to said third passage means within said base, whereby ultimate dispersement of said fissionable material is accomplished by exploding of said explosive charge means and finely dispersing the fissionable material throughout said base.

6. A dispersement apparatus for a mass of fissionable material comprising:

a collecting chamber;

a passage means connected to said collecting chamber, said passage means comprising a plurality of spaced apart separate passages, said passage means capable of receiving liquid fissionable material from said collection chamber; and said passage means terminating into a base of loosely packed material, explosive charge means located within said base of loosely packed material, whereby ultimate dispersement of said fissionable material is accomplished by exploding of said explosive charge means and finely dispersing the fissionable material throughout said base.

* * * * *